Aug. 27, 1968     S. STEINBERG     3,398,454
AUTOMATIC SYSTEM FOR WEB LENGTH MEASUREMENT
Filed Jan. 29, 1965     3 Sheets-Sheet 1
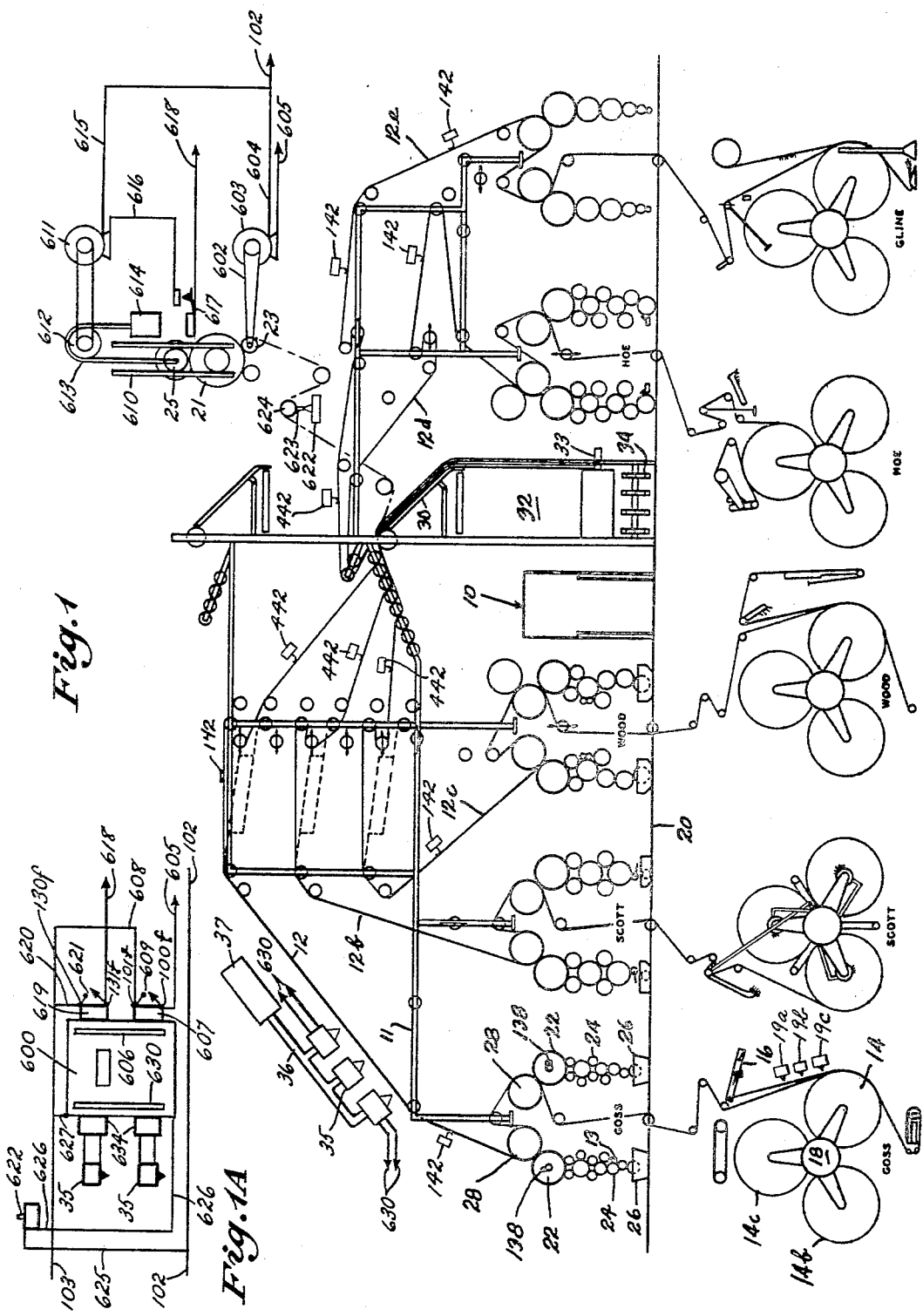

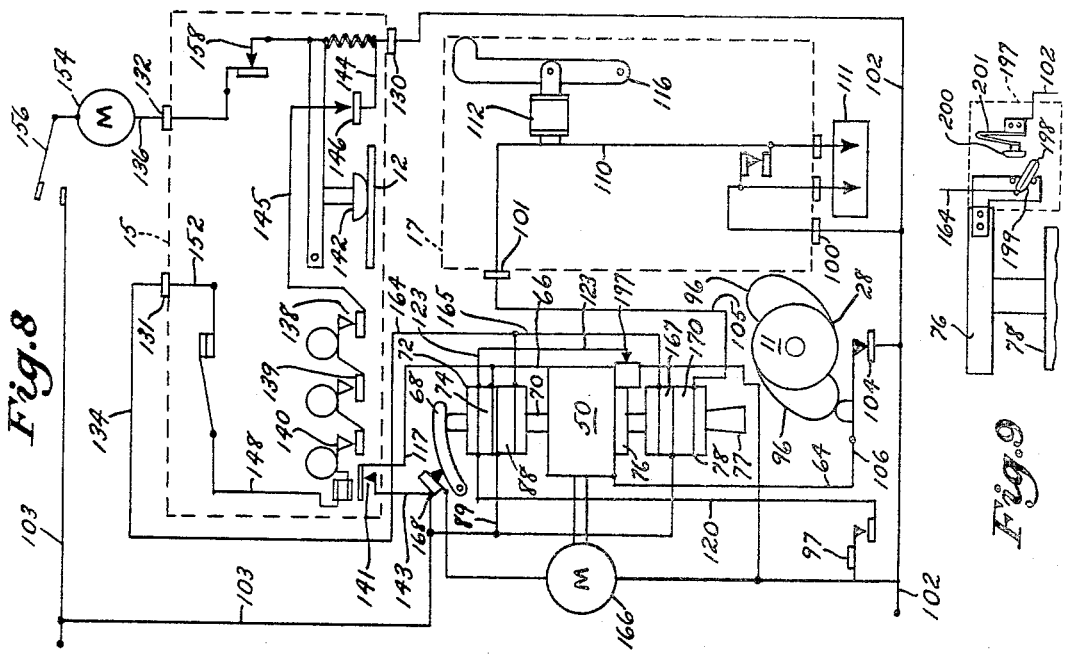
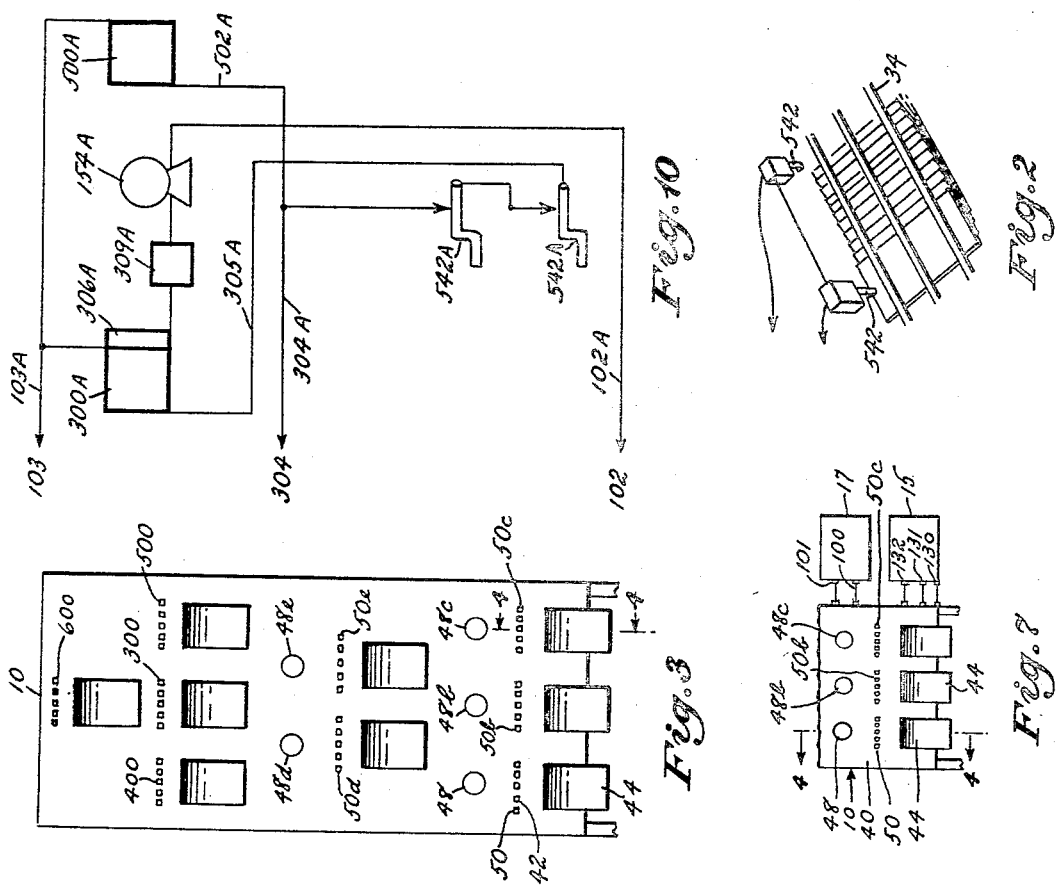

United States Patent Office 3,398,454
Patented Aug. 27, 1968

3,398,454
AUTOMATIC SYSTEM FOR WEB LENGTH MEASUREMENT
Solomon Steinberg, 108—20 68th Road,
Forest Hills, N.Y. 11375
Continuation-in-part of application Ser. No. 186,766,
Apr. 11, 1962. This application Jan. 29, 1965, Ser.
No. 428,929
9 Claims. (Cl. 33—132)

ABSTRACT OF THE DISCLOSURE

Automatic system for web length measurement for use with a continuous web treating machine utilizing a plurality of web portions with interconnection means for said web portions, and rider roll means; in which system printing counters record web breaks, interconnections, rider roll elevation, and total length of each web portion and after a plurality of such webs are concurrently printed or treated and grouped, said counters record incomplete, complete, and perfect so grouped copies, and having preset devices for actuating rider roll elevation, or for stopping this machine after a given measurement.

---

This application is a continuation-in-part of my copending application, Ser. No. 186,766, filed Apr. 11, 1962, now Patent No. 3,167,865, Feb. 2, 1965.

In certain industrial uses it is highly desirable to measure the length of a long continuous web without stopping the movement of the web with a consequent loss of machine production of web product.

Thus, for example, in the case of newspaper, magazine, form, and similar printing, paper coating, laminating, and other "conversions," the paper stock is supplied as large heavy rolls, and it is important that a predetermined paper weight-area ratio be maintained. As compared to a standard or special basis weight if the paper is too light per unit of area, undesirable paper qualities may prevail, such as low opacity, low strength, etc.; and, on the other hand, if time paper is too heavy per unit of area, the cost of the complete newspaper, for example, becomes higher. It is possible to measure the length of the paper web in the roll by unrolling the roll and rewinding it and then making a calculation against the stated or weighed weight. This is time consuming and inconvenient.

It is therefore among the objects of the present invention to measure the length of the web in a given roll, while, for example, the roll is being consumed as it is being unwound in the press, and also combining, with the measuring means mechanisms which can control and improve production.

In modern high-speed newspaper printing presses, a plurality of rolls are mounted on a reel spider combined with a device which automatically connects the end of one roll with the beginning of the next roll. Such devices are referred to as autopasters, and the connecting operation may be automatically or manually initiated.

The controlling impulses for the device which interconnects the web ends, or the actions of the said device itself, are utilized to consecutively discontinue and initiate the action of a plurality or a series of web length measuring elements.

In some pressrooms, autopasters are caused to operate when a pressman visually judges a properly small amount of paper remains on the expiring roll, or when one of the several known types of automatic sensing devices indicates that only a predetermined thickness of wound paper remains on the core. It is therefore among the objects of this invention to make marks or other new indicators, during the manufacture of a roll of paper, at one or more given intervals of length outward from the core which will serve either to signal to a pressman when he is to manually activate the autopaster, or to automatically activate an autopaster operation.

Another object of this invention is to apply a series of different markings or other indicators at predetermined lengths throughout a roll to permit corresponding choices for actuating autopasters or for other signalling and converting operations.

In some instances when the new web is joined to the expiring web, their edges may not be exactly superimposed, or be "in register," as it is known in the art. This sometimes makes it necessary to make a sidewise adjustment of the position of the new web. It is therefore among the objects of the present invention to make specially positioned marks or to provide other indicating means at one or more stated intervals of length in the roll which will serve to actuate a lateral web positioning mechanism, manual or automatic.

Ruptures in the web may also occur from time to time, and either rejoining of the ruptured ends, or re-webbing, becomes necessary. When damaged portion of a web is removed, the original weight-web length ratio becomes inaccurate and perhaps valueless. The location of a break is sometimes a clue to its cause and avoidance. It is therefore among the objects of the present invention to deactivate the web length unit counter when the break occurs, to activate indicating means which show that the reading of a particular web length unit counter is in error, and to print a separate subtotal to show the location of each break.

In modern high speed printing presses, a single web or up to or in excess of ten webs are printed concurrently then brought together at the former 30, into the folder 32, to be folded and cut, then transferred onto the delivery conveyor 34 and in accordance with the present invention, counting devices are installed on any roller which rotates in correlation to the movement of each individual web to reflect the web length units of each web individually, and another counting device is also placed at a suitable point on the press, preferably at the folder, or conveyor, so as to get a plural or parallel count for a number of webs simultaneously. Since ruptures do occur from time to time on one or more webs out of the total being printed, then the web or webs not ruptured will be brought together from the former onward as incomplete copies. This leads to a difficulty in separately accounting for the numbers of complete and incomplete copies.

It is therefore among the objects of the present invention to provide structure for the count accumulation of complete, grouped web length units when there has been no web rupture, and when there is a web rupture, to have a mechanism which tallies the "disregard" or incomplete, grouped web length units, or copies printed. As soon as all ruptured ends are joined, and/or the broken paper rewebbed through the press to a point immediately before or somewhat beyond the folder, the counter of incomplete copies is deactivated, and the counter of complete copies is simultaneously reactivated. Thus, when both counts are totalled, their sum would be that of all copies, complete and incomplete.

The complete copies may include waste or spoiled copies, such as those which contain the adhesive used to fasten webs together at the autopaster, those on which ink adjustments have not been fully made, and others which for various reasons are removed to be discarded. It is therefore, a further object to provide means to distinguish between the good and bad complete copies by having a third counter in addition to the pair previously mentioned which is not activated unless papers are passing a point beyond that at which spoiled copies are removed. This makes more nearly certain the elimination of a condition known in the art as "unaccounted for" copies, since all three types of papers: incomplete, complete-spoiled, and complete-good would be "accounted for."

It is customary in some winding operations, as in pre-printing, paper mills, and the like, to employ a rider roll which does not function as a drive roll, but rather which increases the tightness of wind in the rewound roll, particularly at the start of the winding onto the core. At an appropriate radius out from the core, the rider roll is normally elevated out of engagement and the remainder of the roll wound without it. Sometimes when the operator judges that the paper is not winding well, he may continue winding with the rider roll down until a larger radius is reached. The good or bad winding properties may be a function of non-uniform thickness, or moisture distribution, or fiber distribution, or otherwise, and it is of value to have a record of the length of winding present when the rider roll is raised. It is therefore among the objects of this invention to provide means for indicating the length of paper and/or the diameter of the roll when the rider roll is raised.

It is another object of this invention to combine predetermining or preset signalling devices which function to stop the machines employed in manufacture or conversion, in such manner as to raise the rider roll when a given count, or length, is attained; to stop a paper winder or rewinder when a given length has been wound; to stop a press when a given measurement of good or complete copies has been printed; or similar operations.

In the drawings, in which similar reference characters designate corresponding parts in the several views of the invention:

FIGURE 1 is a schematic view showing an embodiment of the invention.

FIGURE 1A is a fragmentary enlarged detail view of a portion of the rewind circuitry.

FIGURE 2 is a fragmentary perspective of the conveyor of complete copies.

FIGURE 3 is a fragmentary elevational view of a part of FIGURE 1.

FIGURE 7 is a fragmentary elevational view, partly schematic of the lower portion of FIGURE 3.

FIGURE 8 is a circuit schematic of one web feed counter.

FIGURE 9 is an enlarged fragmentary elevational view of the platen of FIGURE 8 and associated switch.

FIGURE 10 is a fragmentary circuit schematic of an alternate form of mechanism for counting the good copies only, and the total complete copies including spoiled.

Figure 4:
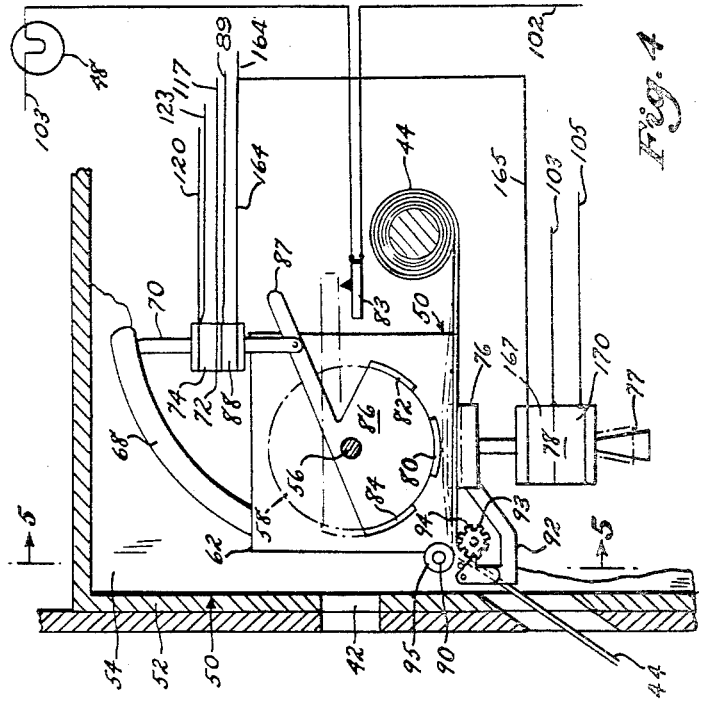
FIGURE 4 is an enlarged fragmentary sectional view at plane 4—4 on FIGURE 3.
Figure 5:
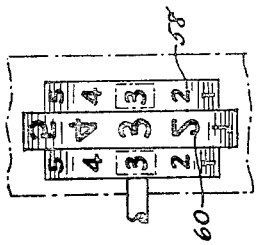
FIGURE 5 is an enlarged fragmentary elevational view at plane 5—5 on FIGURE 4.

While, as I have indicated, the present invention may be used with various wire feeding web feeding and transfer devices, I have chosen for example to show the same as embodied in a combined printing press and winder 11 for printing newspapers, pre-printing, coating, laminating, or the like.

As seen in FIGURE 1, a system, generally indicated by reference character 10, is adapted for use and coacts with five webs 12, 12b–12e. Any desired number of webs may be used with corresponding systems. The structure for any one web is substantially identical with the others so that a detailed description of one 12 will suffice for all.

The web 12, for example, is supplied from the consecutive interconnection of a plurality of rolls 14, 14b and 14c by an autopaster 16, as the rolls carried by the paper supply-carrying spider 18 are rotated into proper position. As seen in FIGURE 1, below autopaster 16 there are a plurality of sensing heads 19a, 19b, and 19c which scan the web for marks which actuate the autopaster, or for edge alignment marks, or for centerfold positioning marks, or for lineal register marks, or the like. The heads are spaced along as well as laterally across the web. After leaving the autopaster 16, the web 12 may pass upward through the pressroom floor 20, about the plate cylinders 22 (inked by ink distribution rollers 24 and fountains 26), impression cylinders 28, over and down former 30, into the folder 32 and onto the delivery conveyor 34. This construction is well known in the printing press art so that more detailed description thereof is not necessary for an understanding of the invention. As indicated, various types such as Goss, Scott, Wood, Hoe and Cline are well known, as are others. After the first roll is counted the autopasters can be manually or automatically operated, and it is the impulse generated thereby, which may be mechanical, electrical, pneumatic, hydraulic, or otherwise, which initiates each subsequent counting action on a given roll web length unit counter. When the system is used for preprinting, coating, winding or laminating, the web or webs are usually wound into a roll 21.

A line source of electrical energy (not shown) is connected across conductors 102 and 103. In counter 50, the count is caused to progressively increase by the counter advancing circuit, with energy traveling along conductor 102 (FIGURE 8) to switch 104, conductor 106, conductor 64, to counter 50, conductor 66, conductor 117, relay 141, conductor 143 and conductor 103.

One or more counter cams 96 are mounted on a part of the press and winder 11 which moves in direct correlation to the lineal surface movement of the web 12. Thus, for example, a cam 96 may take the form of a protuberance on any drum or cylinder which drives or is driven by the web. Furthermore, cam 96 may take the form of a magnet, or a grouping of magnets on any drum or cylinder which drives or is driven by the web. Switch 104 may be any type of magnetic reed switch in close proximity to but not physically contacted by the magnet, and so spaced that the field from the magnet or magnets causes an impulse to be generated. Thus impulses for the counter may be taken from any active drawing or feeding roller which rotates in correlation to the web movement to reflect web length units, and this structure may be integral with the press or may be an attachment. Furthermore, axial movement of an ink distributing roller which is timed to a web feeding roller can be used to intermittently close a switch 13 (FIGURE 1) to generate pulses from web 12 to the counters 50. Thus by way of example I have shown the cams 96 on an impression cylinder 28, and the counter 50 is geared or otherwise adjusted to read in lineal distance precisely equated to the paper contacting periphery of the cylinder 28. As the press and winder combination 11 operates and the web 12 travels therethrough, the counter 50 will add the total length of the web.

The autopaster unit 17 (FIGURE 8) of the system 10 is located on the press and winder 11 and is connected at its terminals 100 and 101 to conductors 102 and 105, respectively. When the roll 14 becomes exhausted, it will be connected to the beginning of roll 14b by autopaster 16 (FIGURE 1), which usually is electrically operated by an impulse in circuit 110 (FIGURE 8) which powers solenoid 112 and shifts the autopaster arm 116 to which is connected known structure such as brush and knife (FIGURE 1). The circuit 110 is completed by suitable known sensing means 111 such as a feeler on the expiring roll, projecting tab on the paper edge at the roll end, or a photocell arrangement, a conducting area on the web, or the like, which may be signalled by pre-marked rolls, such as those described below, or manually.

The web break detector unit 15 (FIGURE 8) of the system 10 is located on the press and winder 11 and is connected at its terminals 130, 131 and 132 to conductors 102, 134 and 136, respectively. Any number of units 15 may be used connected in series so that the greater the number of sensing points, the less the probability of a break to be undetected and/or the more nearly accurate will be the readings. Thus the roller sensing elements 138 are preferably located at a bearing on each of the rollers or cylinders which would or could be removed during normal press operation, such as changing or modifying printing cylinders or plates during the unwinding of a roll 14 to make repairs, adjustments, substitutions, or to change editions. The elements 138 include a relatively fixed contact 139 and movable spring contacts 140 which open when a roller or cylinder is removed, thereby breaking the circuit and preventing a false indication of rupture caused by slack in the web 12 allowing the feeler shoe 142 to drop as urged down by the contractile spring between the end of the lever carrying shoe 142 and stationary conductor 144, which would close the circuit from conductor 102 through conductor 144, switch 146, conductor 145, conductor 148, switch 150, and conductor 152. Similarly the feeler shoes 142 are preferably located at all spans of the web 12 between pressure contacting rollers, so that a break in the web will be immediately detected.

The motor 154 which drives the press and winder 11 is connected to conductor 103 through switch 156 and to conductor 136. This enables switch 158 to stop motor 154 if shoe 142 drops because of web breakage.

On the panel 40 (FIGURES 3 and 7) are mounted a plurality of roll web length unit counters 50, 50b, 50c, 50d, and 50e and web rupture indicating means 48, 48b, 48c, 48d and 48e. The counters are readable through the windows 42, and print their readings on tapes 44. In accordance with the present invention, the actual precise length of the roll 14 will appear through a window 42 on counter 50 and will appear in print on a tape 44 therebelow, the instant that roll 14 is consumed. If the web of roll 14 should break, the signal light or similar indicating means 48 will be activated, a colored or opaque pane 84 will obscure the reading through window 42, and a printing on tape 44 will appear in a distinctive color, such as red as a subtotal since the counter will not reset to zero.

As soon as roll 14b is connected into the continuous web by autopaster 16, as at the end of roll 14, a total in the same distinctive color is printed for roll 14, counter 50 resets to zero and black ribbon, then resumes counting and the operation, just described, is repeated. Similarly the actual length of roll 14c is counted on counter 50. Depending on the length of the run or similar considerations, additional rolls 14 may be incorporated in the system 10. The counters 50 may be calibrated to read in feet or other desired units of measurement.

Turning to FIGURE 4, counter 50 may include a housing 52, and between the vertical side walls 54 is journalled a horizontal shaft 56 which forms the support for the counter wheels 58 and 60, which are the reading and printing wheels, respectively. The well-known operating mechanism 62 for driving the counter wheels is preferably electrically actuated (conductors 64 and 66, conductor 117, relay 141, conductor 143 and conductor 103, FIGURE 8). The rod 70 is frictionally retained in displaced positions thereof so that the magnetic slug thereon is shifted up by winding 74 and down by winding 88 of solenoid 72.

A normal or black ink printing ribbon 80, a disregard or red ink printing ribbon 82, and a colored pane 84 are carried by the cradle 86, pivotally mounted on shaft 56, and adapted to move clockwise (FIGURE 4) upon energization of the disregard winding 88, to a position where the ribbon 82 is directly opposite the printing platen 76 with the tape 44 therebetween, and the pane 84 lies between window 42 and the wheels 58, and cradle arm 87 closes switch 83 which closes circuit to activate indicator means 48.

The platen 76 is part of the armature 77 of solenoid 78 which, when energized, elevates platen 76 against gravity to compress tape 44 against wheels 60 with either ribbon 80 or 82 therebetween. When de-energized, armature 77 descends operating the tape advancement means 90 including pawl 92, ratchet wheel 93, drive roller 94 and pressure roller 95.

The counters 50 are provided with manual reset. When reset switch 97 is closed, the circuit is completed via conductors 102, 120, reset winding 74 on solenoid 72, conductor 117, relay 141, conductor 143 and conductor 103. When the reset winding 74 is energized, it causes the upward movement of slidable rod armature 70, thereby moving lever 68 which closes switch 168 in circuit to the reset motor 166.

The counters 50 are provided with automatic reset. When autopaster unit 17 sends an impulse via conductor 105, to winding 170 of solenoid 78 to conductor 103, it causes platen 76 to rise, and the total then appearing on counter 50 to print on tape 44. The automatic reset circuit includes a switch 197, which has a pivotal contact finger 198 swingable between two detents. The upper surface of finger 198 has an insulating member which prevents contact of the conducting portion 199 during upward travel. During downward travel, the portion 199 wipes the relatively stationary contact point 200, which is resiliently mounted on spring 201. Thus, after the printing impression has been completed, during downward travel of platen 76, a circuit is completed via conductor 123 to reset winding 74, conductor 117, relay 141, conductor 143 and conductor 103. Thus, the counters 50 will print and reset to zero via switch 168 and motor 166 when each roll is consumed, and the reading will be the length of each roll as consumed (except when the "disregard" circuit causes printing in a different color, and the indicated linear distance between the red number and the next preceding black number may be in error; as shown below).

In the event of a web rupture, the counter 50 prints a subtotal but does not reset. A circuit is completed through switch 146, conductor 145, elements 138, the solenoid of relay 141 (thereby raising its armature, opening the circuit between conductors 117 and 143), conductor 148, switch 150, conductors 152 and 134, conductor 164, to winding 88 on solenoid 72, and conductor 89 to conductor 103.

When winding 88 is energized, it causes the downward movement of slidable rod armature 70, thereby pushing cradle arm 87 (FIGURE 4) down and switch 83 closes a circuit between conductor 102, indicator means 48, and conductor 103. At the same time, ribbon 82 and pane 84 go into the "disregard" position where they remain until reset winding 74 is subsequently energized. Energization of relay 141 interrupts the circuit for counter 50 immediately upon a rupture.

Simultaneously with the energizing of winding 88, a circuit is completed from conductor 164 to conductor 165, to winding 167 of solenoid 78, then to conductor 103, causing platen 76 to rise and press tape 44 against wheels 60 with ribbon 82 therebetween. Now, after the printing impresison has been completed, during downward travel of platen 76, the circuit via switch 197, conductor 120, reset winding 74, and conductor 117, remains open at relay 141; motor 166 is not energized, and counter 50 is not reset to zero. The printing without reset at the occurrence of a web break is therefore a subtotal in a distinctive color. The remaining free ends of the web are joined in repair, and counter 50 resumes its operation. When autopaster 16 connects the following roll into the continuous web, a total in the same distinctive color is printed, and counter 50 resets to black ribbon and zero, as described above, because relay 141 is not now energized.

If little or no paper was lost in connecting the free ends of the broken web, the total printed for the consumed roll although printed in a distinctive color is still essentially correct. Sometimes a sufficiently wide gap is created between the broken ends of web 12 so as not to readily allow their being rejoined. The broken portion no longer connected to roll 14 may be torn or cut away, and/or drawn through the press, former, folder, etc., to be discarded, after which roll 14 needs to be rewebbed. This makes the reading on that particular roll inaccurate. If more than one web is being printed simultaneously, during the repair of the broken web, the others would be passing through the press, and incomplete copies delivered to the conveyor, which will be indicated on the incomplete copy counter 400.

The present embodiment is an improvement over the parent application principally by the incorporation of four counters 300, 400, 500 and 600. Counter 300 indicates satisfactory, delivered, complete copies; counter 400 indicates incomplete copies; counter 500 indicates unsatisfactory, spoiled, or undelivered complete copies. Counter 600 indicates the length of rewound roll 21 and the subtotal length of the latter at which the rider roll is elevated.

Figure 6:
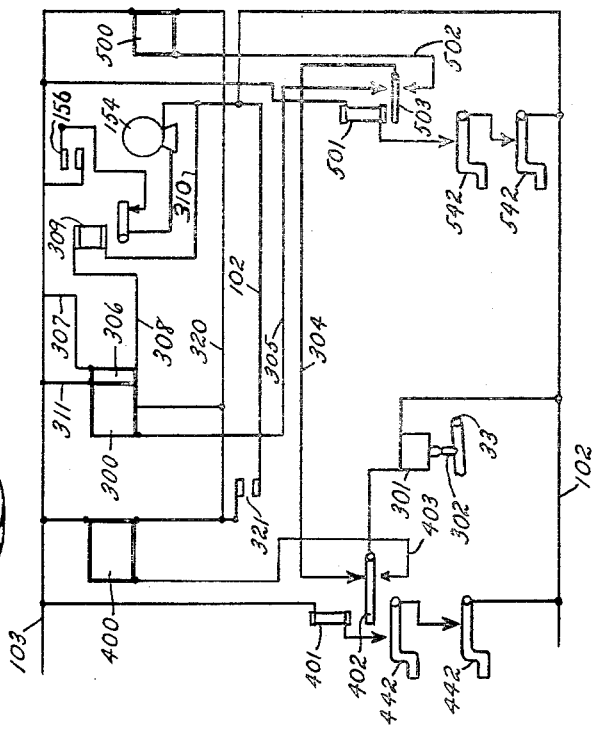
FIGURE 6 is a circuit schematic of the counters of plural or parallel webs, the rewind roll counter.

Turning to the central portion of FIGURE 6, counter 300 is integrated into the system so that counting impulses correlated to revolutions of the folder shaft 33 or other suitable locations, as described above, are provided by switch 301. Switch 301 is actuated by a cam 302 fixed on shaft 33 (or this may be a magnet and magnetic reed switch, as mentioned above). The circuit includes conductor 102, switch 301, conductor 303, armature 402 of relay 401, conductor 304, armature 503 of relay 501, conductor 305, counter 300, conductor 311, and conductor 103.

Connected to the counter 300 is a known preset device 306 which after a predetermined number of counts have been accumulated, opens the circuit via conductors 307, 308 and 310 to the solenoid of relay 309, thereby breaking the current supply to the main motor 154. This enables the operator to have the system 10 stop after the desired number of complete acceptable copies have been produced.

At the left portion of FIGURE 6, counter 400 is integrated into the system so that a break in any of the webs 12, 12b, 12c, 12d, and 12e will cause counter 400 to count, and counters 300 and 500 to be inactive when any web break shoe 442 prior to the former 30 falls. Since all of the shoes 442 are connected in series, a break of web at any shoe interrupts the current from conductor 102 to conductor 103 through the relay 401, whereby the armature 402 drops to complete the circuit from conductor 303 to conductor 403 through the counter 400, thence to conductor 103.

Thus if the operator causes the remaining continuous webs to pass into the folder 32 in the form of incomplete copies, the counter for incomplete copies 400 will accumulate, while no signals from switch 301 can reach counters 300 or 500.

At the right portion of FIGURE 6, counter 500 is integrated into the system so that a break in the continuity of complete copies beyond a given point (at the location of web break shoes 542 or similar sensing devices) along the conveyor 34 will cause counter 500 to count and counter 300 to be inactive.

When either because the operator physically removes faulty copies, or diverts them, or if for any other reason there is a break in the continuity of copies moving along the conveyor 34, at least one of the shoes 542 falls, and since all of the shoes 542 are connected in series, it breaks the circuit from conductor 102 to conductor 103 through the relay 501, whereby the armature 503 drops to complete the circuit to the counter 500. The circuit to counter 500 is completed through conductor 102, switch 301, conductor 303, armature 402, conductor 304, armature 503, conductor 502, counter 500, and conductor 103.

Adding the totals displayed by the three counters 300, 400, and 500 will give a sum equal to the total production, and effectively eliminates the factor known in this field as "unaccounted for" copies.

On some machines, where little or no conveyor 34 exists after folder 32, there would be no need or use for a counter 500.

In this case, conductor 304 would connect directly to conductor 305, and the series of components numbered in the 500's completely eliminated. Or, if the long conveyor existed, and the separation into good and spoil complete copies were not desired, the same could be done. In the latter instances, adding the totals displayed by the two counters 300 and 400 will give a sum equal to the total production of complete and incomplete copies respectively.

In the alternate form as shown in FIGURE 10, counters 300 and 500, and relay 501 of FIGURE 6 are omitted and counters 300A and 500A are substituted. Picking up and connecting to the conductors 103, 304, and 102 are conductors 103A, 304A, and 102A. Certain of the other parts corresponding to the lower right hand portion of FIGURE 6 are given the same reference characters with the addition of a suffix "A." In the version shown in FIGURE 10, counter 500A will count all complete copies, both good and spoiled. Counter 300A will count only those copies passing a certain point along the conveyor (where the shoes 542A are located on the conveyor 34) so that if any shoe falls, the count will be interrupted, since the shoes 542A are in series with counter 300A. The difference between the counts shown by counters 300A and 500A is equal to the number of copies removed from the conveyor 34.

Counters 300, 400 and 500 (also, 600, see below) are substantially identical to counters 50, as shown in FIGURES 4 and 8, except that the cradle 86 and associated parts are omitted, since printing in a single color is all that is required. Whenever the operator completes a run, see FIGURE 6, he may close switch 321, which will complete a circiut via conductors 102 and 320 to the several solenoid windings in said counters, thence to conductor 103. This provides total printout and automatic reset.

It is customary in some preprinting, coating, laminating, and other rewind operations to form a web or webs into a roll of material instead of folding and/or cutting into units or sections. The present embodiment shows the webs 12 leading from the roller top-of-former 30 (FIGURES 1 and 1A) around tension and idling rollers, then around drive roll 23 to be formed into the rewind roll 21, or rewind rolls 21 if the web is being slit into several widths. It is common practice to secure webs 12 to a core (or group of cores when slit) following which rider roll 25 is lowered until it rests on the core or cores. The rider roll 25 does not function as the drive roll, and it is raised before roll or rolls 21 have been wound to the desired total length or diameter.

The measurement of total web length is performed with counter 600 which is essentially the same as counters 300, 400 and 500. Drive roll 23 is driven by belt 602 and motor 603 which receives power via conductors 102, 604, 605, switch 607 in preset device 606, conductors 608, and 103. Switch 609 is a manual switch which is parallel with switch 607.

The preset device continues to supply current to motor 603 until a predetermined number of units of length has been wound or fabricated into the roll 21, and when that total is reached on counter 600, a switch (such as in FIGURE 1B) is actuated to stop the motor which drives the web treating machine, and also closes the printing circuit, such as shown in FIGURE 8, the contacts 100f and 101f being substituted for contacts 100 and 101. Thus, when this number is printed, the counter automatically resets and is ready for the next run.

The rider roll 25 is adapted for vertical reciprocation in guides 610, and is raised and lowered by a motor 611 driving sprocket 612, carrying chain 613 and counterweight 614. Motor 611 receives power via conductors 102, 615, 616, limit switch 617, conductor 618, preset device switch 619, conductors 620 and 103. A manual switch 621 parallels switch 619. Closure of this circuit through switches 619 or 621 elevates the rider roll 25, and closes the printing circuit in counter 600, the contacts 130f and 131f being substituted for the contact 130 and conductor 145 in FIGURE 8. Thus, elevation of the rider roll 25 causes the counter to print without reset, since relay 141 is energized and its contacts open.

Counter 600 is actuated by switch 622 which is intermittently closed by projection 623 on the shaft of roller 624, or other web travel correlated part. The circuit through counter 600 and switch 622 is completed via conductors 102, 625, 626, 627 and 103.

As seen in the upper left portion of FIGURE 1, means 35 are provided for the premarking of continuous webs in a manner which can be utilized to actuate an autopaster, actuate a web positioning device, function as guide or preregister marks, or cause like events to be signalled. The markings may be made in several positions to permit selective choices, or the marks may be made with several materials to permit selective choices or to command different events, and so forth.

Although many materials and means may be employed to apply color marks, or magnetic materials, or alter conductivity or thickness, or render a paper web more nearly transparent as by the use of oils, or other substances, etc., I have chosen, for example, a pipe line 36 connected to a source of compressed air, and having individually controlled spray heads on containers of marking material which may be placed at any position desired, such as the paper edge, the exact center of each roll, and so on.

The intensity, duration, and placement of the indicia produced by said spray heads is effected by the preset device 630 driven by the counter 600.

Thus, for example, the preset device 630 may be programmed to apply the colors violet, blue, green, orange and red at intervals of 25 feet along the web after a predetermined lineal count has been reached. Then, using corresponding filters, the colored spots, when the web is rerun, may selectively initiate independent web treating steps, such as, actuating an autopaster, a laminating device, a coating device, or similar conversion.

Figure 1B:
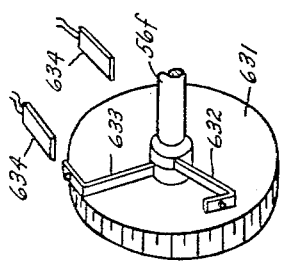
FIGURE 1B is a perspective view of a preset device.

Various preset devices, for example, 306, 606, and 630, are indicated in the drawings in block diagrammatic form, and may be either of standard construction, or of a construction as shown in FIGURE 1B.

Here, the drum 631 is keyed to the shaft 56f of any counter with which it is associated. Adjustably mounted on and detachable from the drum 631 are a plurality of cam sectors 632 and 633, which coact with precision switches 634. Since this is an exemplary showing, it will be understood that the preset devices may be set to turn on and off at predetermined times, and to maintain a current flow for pre-determined durations, as required to satisfy the particular production requirements of the system 10.

I wish it to be understood that I do not consider the invention limited to the exact details of structure shown and described in this specification, for obvious modifications will occur to a person skilled in the art to which the invention pertains.

I claim:

1. A system for web length measurement for use with a continuous web treating machine having a plurality of webs that are printed, converted, or otherwise acted upon concurrently, means to bring together the webs so acted upon concurrently, each web having its own web feed means, a plurality of independent web portions in the form of rolls, or in the form of other successive lengths within each web feed means, and interconnection means for joining the end of one web portion to the beginning of the next web portion within each web feed means, said system comprising: measuring means associated with the web feed means for the plurality of webs providing an impulse for each predetermined unit of length of the plurality of webs as the group of webs travels along said web feed means; first and second counters of unit of length of the plurality of webs which count when actuated by said impulses; break sensing means on each web, all connected in series to said counters; and means actuated by the said break sensing means to alternately connect said measuring means to the first counter when any independent web breaks and to the second counter when there are no independent web breaks.

2. Structure as claimed in claim 1 wherein there is a switch connected to a predetermining device which can be preset to a given total of a number of units of a group of webs, whereby when such total is reached on the second counter, the said switch is actuated to stop the web treating machine.

3. A system for web length measurement for use with a continuous web treating machine having a plurality of webs that are printed, converted, or otherwise acted upon concurrently, means to bring together the webs so acted upon concurrently, each web having its own web feed means, a plurality of independent web portions in the form of rolls, or in the form of other successive lengths within each web feed means, and interconnection means for joining the end of one web portion to the beginning of the next web portion within each web feed means, said system comprising: measuring means associated with the web feed means for the plurality of webs providing an impulse for each predetermined unit of length of the plurality of webs as the group of webs travels along said web feed means; first, second and third counters of unit of length of the plurality of webs which count when actuated by said impulses; individual web break sensing means on each web and all connected in series to said counters; and means actuated by said break sensing means on each web to alternately connect the measuring means to the first counter when any individual web breaks, and to the second or third counters when there are no breaks of individual webs; and when there are no breaks of individual webs, sensing means for the absence of the complete plurality of webs, and switching means actuated by said sensing means for the absence of the complete plurality of webs to deactivate the second counter and activate the third counter; and the first counter showing only units of length of the plurality of webs wherein one or more individual webs have been broken and are missing, the group counter containing the units which are incomplete; the second counter showing units of length of the plurality of webs wherein no individual webs are missing but wherein some of the units of length of the complete plurality of webs are absent, the second group counter containing part of the complete plurality of webs; the third counter showing units of length of the plurality of webs wherein no individual webs are missing, but showing those units of length of the complete plurality of webs absent from the second counter, whereby partial complete units are shown on both the second and the third counters and the total of these two counters equals all complete units.

4. Structure as claimed in claim 3 with the addition of a switch connected to a predetermining device which can be preset to a given total of a number of units of a group of webs, whereby when such total is reached on the second counter, the switch is actuated to stop the web treating machine.

5. A system for web length measurement for use with a continuous web treating machine having a plurality of webs that are printed, converted, or otherwise acted upon concurrently, means to bring together the webs so acted upon concurrently, each web having its own web feed means, a plurality of independent web portions in the form of rolls, or in the form of other successive lengths within each web feed means, and interconnection means for joining the end of one web portion to the beginning of the next web portion within each web feed means, said system comprising: measuring means associated with the web feed means for the plurality of webs providing an impulse for each predetermined unit of length of the plurality of webs as the group of webs travels along said web feed means; first, second and third counters of unit of length of the plurality of webs; individual web break sensing means on each web and all connected in series to said counters; and means actuated by said break sensing means on each web to alternately connect the measuring means to the first counter when any individual web breaks, and to the second or third counters when there are no breaks of individual webs; and when there are no breaks of individual webs, sensing means for the absence of the complete plurality of webs, and switching means actuated by said sensing means for the absence of the complete plurality of webs to deactivate the second counter; the first counter showing only units of length of the plurality of webs wherein one or more individual webs have been broken and are missing, the group counter containing the units which are incomplete; the third counter showing units of length of the plurality of webs wherein no individual webs are missing, or the total of complete units; the second counter showing only units of length of the plurality of webs wherein no individual webs are missing but wherein some of the units of length of the complete plurality of webs are absent, whereby the total of the third counter minus the total of the second counter is equal to the number of complete units which are absent or have been removed.

6. Structure as claimed in claim 5 with the addition of a switch connected to a predetermining device which can be preset to a given total of a number of units of a group of webs, whereby when such total is reached on the second counter, said switch is activated to stop the web treating machine.

7. A system for web length measurement for use with a continuous web treating machine having web feed means, a plurality of independent web portions, and interconnection means for joining the end of one web portion to the beginning of the next web portion, said system comprising: a winding roll and a rider roll coacting therewith, measuring means associated with said web feed means supplying an impulse for each predetermined unit of web length as the web travels along said web feed means; a web length unit counter; said measuring means actuating said counter; rider roll raising means for elevating said rider roll; a predetermining device which can be preset to a given total of web length units, a switch connected to said device and said rider roll raising means whereby when such total is reached on the counter, said switch actuates the rider roll raising means, after which the web treating machine continues operation until the termination of the roll count.

8. Structure as claimed in claim 7, having first and second switches connected to a predetermining device which may be preset to two given totals of web length units, whereby when the first total is reached, the first switch actuates the rider roll raising means, the web treating machine continuing to the second total at which point said second switch is actuated to stop the web treating machine.

9. A system for web length measurement for use with a continuous web treating machine having web feed means, a plurality of independent web portions, and interconnection means for joining the end of one web portion to the beginning of the next web portion, said system comprising: measuring means associated with said web feed means providing an impulse for each predetermined unit of web length as the web travels along said web feed means; a web length unit printing counter; independent rider roll raising indicating means in said counter positively printing a count without reset (subtotal), and rider roll raising sensing means connected to said printing means, activating said indicating means upon raising the rider roll without interrupting the count or stopping the web treating machine which then continues to the termination of the roll count, and prints the total continuous web length.

References Cited
UNITED STATES PATENTS 2,939,646    6/1960    Stone _____ 242—58.2
3,087,248    4/1963    Martin _____ 33—132

LEONARD FORMAN, *Primary Examiner.*

F. J. D'AMBROSIO, *Assistant Examiner.*